United States Patent [19]
Burns

[11] Patent Number: 6,098,090
[45] Date of Patent: Aug. 1, 2000

[54] METHODS AND SYSTEM FOR PROVIDING A BACKGROUND PROCESSING THREAD WHICH MANAGES THE BACKGROUND TASKS OF EXTERNAL THREADS

[75] Inventor: Steven P. Burns, Redmond, Wash.

[73] Assignee: Novell, Inc., Provo, Utah

[21] Appl. No.: 08/968,741

[22] Filed: Sep. 5, 1997

[51] Int. Cl.[7] ........................................ G06F 9/00
[52] U.S. Cl. .......................................... 709/107
[58] Field of Search .................... 709/100, 101, 709/102, 104, 106, 107

[56] References Cited

U.S. PATENT DOCUMENTS

| | | |
|---|---|---|
| 4,800,521 | 1/1989 | Carter et al. ............................ 709/102 |
| 5,175,855 | 12/1992 | Putnam et al. . |
| 5,404,536 | 4/1995 | Ramakrishnan et al. . |
| 5,528,513 | 6/1996 | Vaitzblit et al. ........................ 709/103 |
| 5,530,858 | 6/1996 | Stanley et al. .......................... 709/107 |
| 5,542,088 | 7/1996 | Jennings, Jr. et al. .................. 709/103 |
| 5,694,604 | 12/1997 | Reiffin .................................... 709/107 |

*Primary Examiner*—Majid Banankhah
*Attorney, Agent, or Firm*—Dinsmore & Shohl

[57] ABSTRACT

A background processor for executing one or more background processes in a single thread. The background processor eliminates system overhead associated with setting up and executing multiple threads. An easy to use object-oriented interface is provided which allows external threads to request the registering and unregistering of background processes as desired.

20 Claims, 9 Drawing Sheets

METHODS AND SYSTEM FOR PROVIDING A BACKGROUND PROCESSING THREAD WHICH MANAGES THE BACKGROUND TASKS OF EXTERNAL THREADS

TECHNICAL FIELD

The present invention relates to task processing, and more specifically relates to a method and system for executing multiple background processes in a single thread.

BACKGROUND OF THE INVENTION

In a multitasking computer environment, the operating system or the programs divide the microprocessor's time among a number of different programs. Such programs frequently require that relatively small background tasks be performed, such as, for example, monitoring the selection of a user interface button, or the choice of a menu selection. Typically, such programs spawn a separate thread to perform such background tasks. Like all tasks, the process for starting such relatively small threads consumes limited system resources such as memory and processing time.

In addition to the consumption of memory and processor resources, other inefficiencies accrue through the use of such relatively small background threads. For example, task switching between active threads is a relatively resource intensive process. Consequently, the greater the number of threads an operating system must switch between, the greater the strain on system resources. Since it is not uncommon in modem operating systems to have 10–20 programs running, each of which may spawn off several individual background processes, the processor and memory can quickly become overburdened just handling relatively small background threads. Much of the processing is not related to the function of the background task itself, but rather to the system overhead required to handle thread switching. In fact, in some conventional operating systems, such as the MICROSOFT WINDOWS 95 operating system, spawning and maintaining a thread is a relatively inefficient process. Additionally, the operating system typically imposes a limit on the number of threads which can be active at any one time.

Eliminating the system overhead required to handle the various background processing tasks would make more efficient use of the processor and the system memory. It is apparent that a background processor which performs required background processing chores, while eliminating the system overhead associated with maintaining multiple threads, and reducing memory consumption would be highly desirable.

SUMMARY OF THE INVENTION

It is one object of this invention to provide a method and system which efficiently executes background tasks.

It is another object of this invention to provide a method and system for background processing which enables a task to register the execution of one or more background tasks.

It is yet another object of this invention to provide a background processor which minimizes the amount of system resources required to run background tasks.

It is still another object of this invention to provide a method and system for background processing which eliminates task switching among background processes.

Additional objects, advantages and other novel features of the invention will be set forth in part in the description that follows and, in part will become apparent to those skilled in the art upon examination of the invention. To achieve the foregoing and other objects and in accordance with the purposes of the present invention as described above, a method and system for executing a background process are provided. A first thread having a background task to be executed passes a background task reference to a background processor having a thread which executes background tasks. The background processor includes a pending task structure and an active task structure. The first thread invokes a function, or method, of the background processor to insert the background task reference into the pending task structure. Periodically, the background processor examines the pending task structure to determine if background tasks have been registered for execution. Upon determining that one or more references exist in the pending task structure, the background processor moves the references from the pending task structure to the active task structure. The background processor reads the active task structure and executes the background tasks in the same thread via the references.

According to one embodiment of this invention, the background task reference passed to the background processor includes a function pointer, or other such reference, and a list of arguments required for the background task. The background processor translates the function pointer and arguments into a unique signature and uses this signature as a reference.

The first thread, or any other thread with the correct signature, can also request that the background task be unregistered. This can be achieved by invoking a method of the background processor which inserts the reference and arguments into a task removal structure. Periodically, the background processor traverses the task removal structure, and for each reference in the task removal structure, removes the matching reference from the active task structure. After the reference has been removed from the active task structure, the background processor no longer executes the background task.

It is apparent that a background processor which uses a single thread to run many background tasks would be advantageous. By running many tasks in a single thread, task switching among background tasks is eliminated, and memory and processor time associated with setting up and tearing down threads is also eliminated. Further, the background processor according to this invention simplifies the development effort required to initiate separate threads by offering an easy to use object-oriented interface for the registration of background tasks. Moreover, there is no limit to the number of tasks the background processor can execute, so a maximum thread limitation imposed by some operating systems is avoided.

Still other objects of the present invention will become apparent to those skilled in this art from the following description wherein there is shown and described preferred embodiments of this invention. As will be realized, the invention is capable of other different obvious aspects all without departing from the invention. Accordingly, the drawings and description will be regarded as illustrative in nature and not as restrictive.

BRIEF DESCRIPTION OF THE DRAWINGS

The accompanying drawings, incorporated in and forming part of the specification, illustrate several aspects of the present invention, and together with the description, serve to explain the principles of the invention. In the drawings.

Reference will now be made in detail to present preferred embodiments of the invention, examples of which are illustrated in the accompanying drawings, wherein like numerals indicate the same elements throughout the views.

DETAILED DESCRIPTION OF PREFERRED EMBODIMENTS

Figure 1:
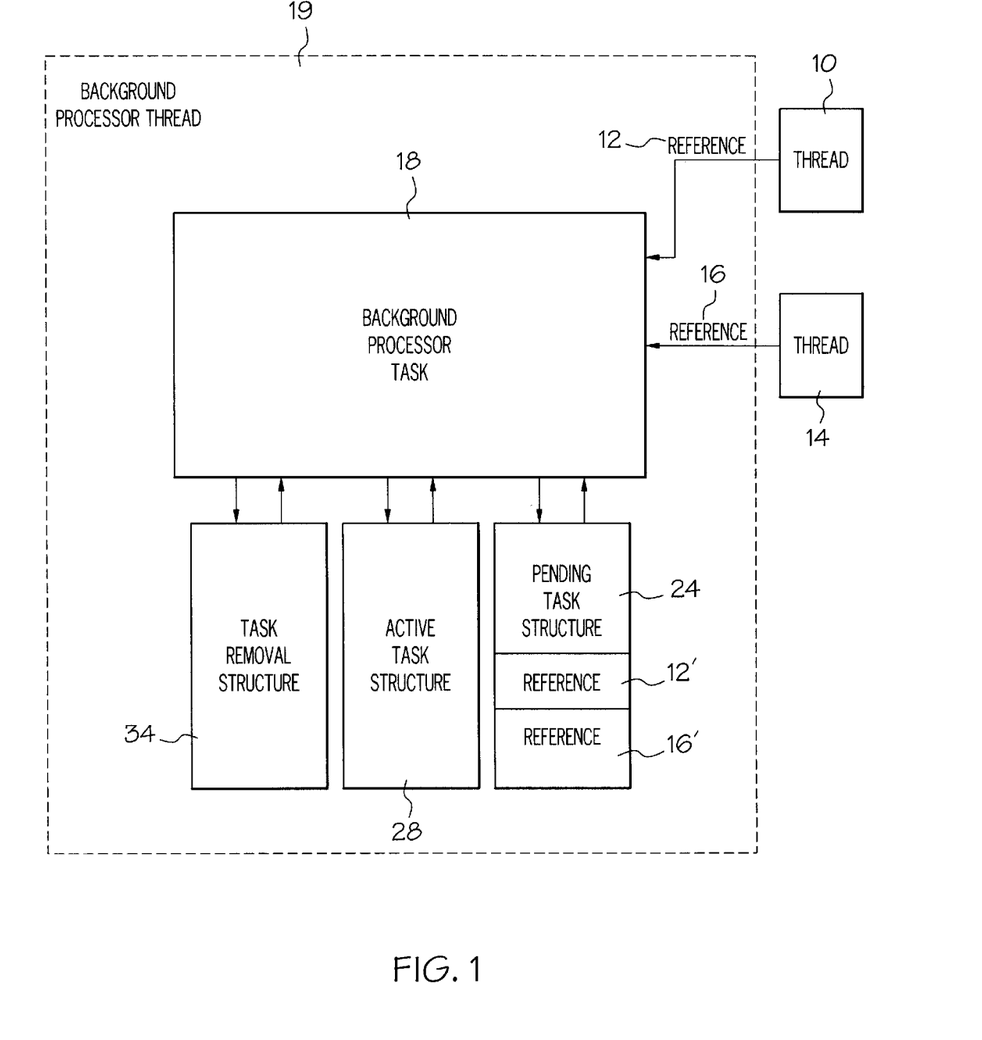
FIG. 1 is a block diagram illustrating two threads passing background task references to the background processor, according to one embodiment of this invention.

Referring now to the drawings, FIG. 1 shows a background processor thread 19 according to one embodiment of this invention. The background processor thread 19 includes a background processor task 18, a pending task structure 24, an active task structure 28, and a task removal structure 34. The background processor task 18 encompasses both the stack and the code for implementing the functionality of the background processor thread 19, as described herein.

Generally, background processor task 18 receives a background task reference from an external process, such as a thread 10, to a background task to be executed. Background processor task 18 inserts the reference in a data structure, such as pending task structure 24. Periodically, background processor task 18 traverses pending task structure 24 and transfers each reference located in pending task structure 24 to another structure, such as active task structure 28. Background processor task 18 repeatedly executes all background tasks referred to by references in active task structure 28. Preferably, background tasks are relatively short in duration, so they do not impede processing of other background tasks referred to in active task structure 28. Each task referred to in active task structure 28 will be repeatedly processed by background processor task 18, in a single thread, until an external thread requests that the particular background processor task be unregistered, or until the task itself returns a value, such as a false value, indicating that the task should no longer be processed.

Upon a request by an external thread to unregister the background task, or a request by the background task itself, a reference to the background task is inserted in a third structure, such as task removal structure 34. Periodically, background processor task 18 traverses task removal structure 34, and removes all references in active task structure 28 which are identified in task removal structure 34.

Background processor thread 19 can execute on any conventional multitasking operating system. Conventional programming languages, such as C, C++ and JAVA can be used to develop background processor task 18. According to a preferred embodiment of this invention, background processor task 18 is developed with the JAVA object-oriented programming language, and interaction with background processor task 18 from external processes such as threads 10 and 14 is via a JAVA Interface class which is implemented in each of threads 10 and 14, and through method invocations. Such implementation eases the ability of external processes such as thread 10 to utilize background processor task 18 through simple object-oriented programming techniques.

As shown in FIG. 1, thread 10 communicates a background task reference 12 to the background processor task 18. Preferably, background processor task 18 offers a function, or method which thread 10 can invoke to indicate that a background task is to be registered.

The reference 12 includes a background task identifier, such as a pointer to a function, or a reference to an object. Additionally, the reference 12 may contain an argument for the task. Before storing the reference 12 in the pending task structure 24, the background processor task 18 can combine the task identifier and the argument into a "pair" (sometimes referred to as a "two-tuple"), forming a new reference 12', which is essentially a pattern of bits which uniquely identifies the particular task identifier and argument(s). The mechanism for forming such a "pair" is known to those skilled in the art. While the use of a "pair" is not necessary, it allows a single thread to register execution of the same background task multiple times, so long as different arguments are used. Similarly, the thread 14 can communicate a reference 16 to the background processor task 18. Reference 16 is formed into a "pair", referred to as reference 16'.

If the reference 12' is not already pending in the pending task structure 24, the background processor task 18 stores the reference 12' in the pending task structure 24. Periodically, the background processor task 18 traverses the pending task structure 24, and upon determining the existence of the reference 12' retrieves the reference 12' from the pending task structure 24 and moves the reference 12' to the active task structure 28. The background processor task 18 can retrieve references stored in the pending task structure 24 either consecutively or concurrently. For example, the pending task structure 24 can comprise a linked list, and the background processor task 18 can traverse the linked list, retrieving items consecutively. According to another embodiment of this invention, the pending task structure 24 can comprise an array, and the background processor task can read and move multiple references concurrently.

Figure 2:
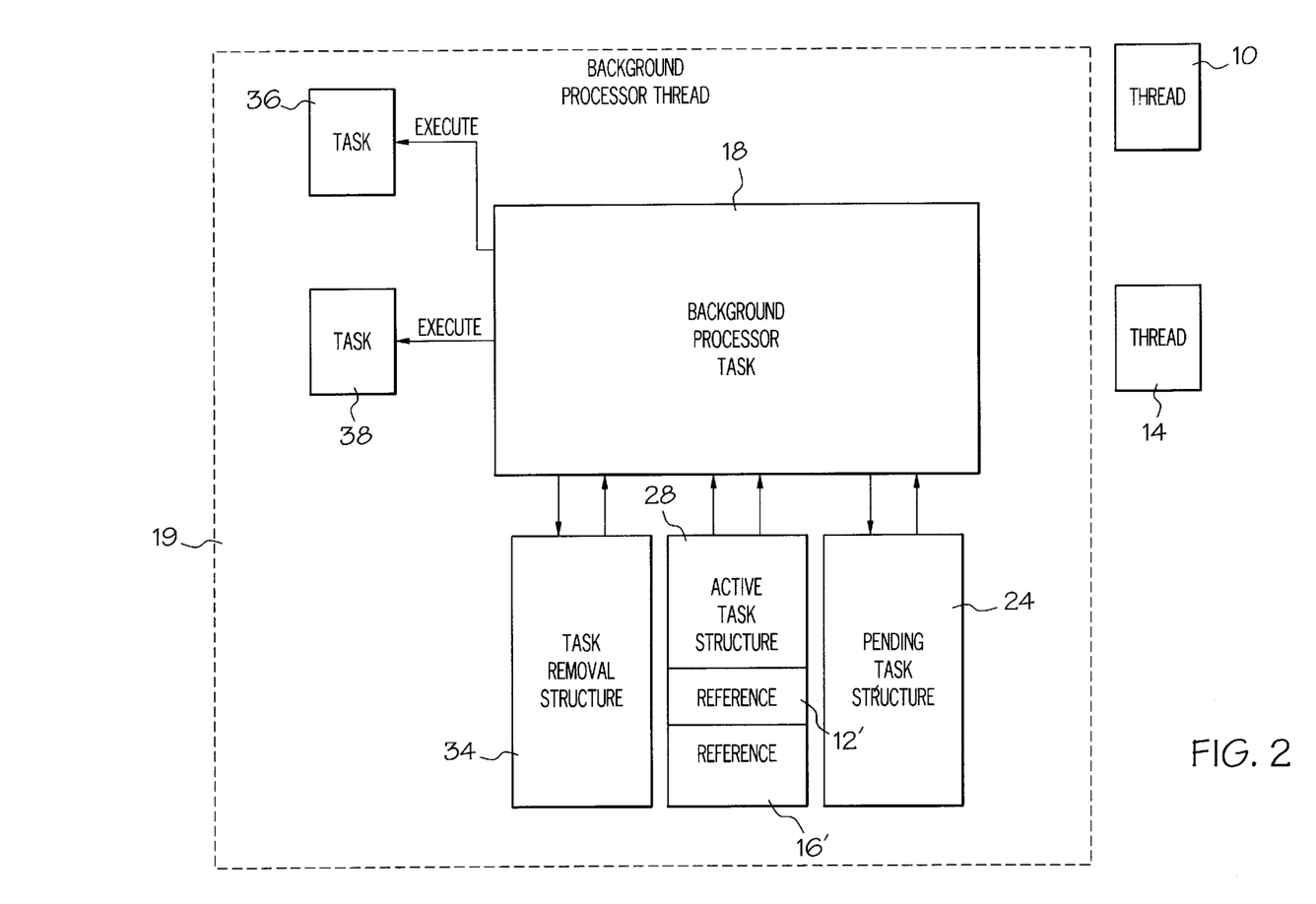
FIG. 2 is a block diagram illustrating the background processor executing multiple background tasks in a single thread.

FIG. 2 shows another aspect of the background processor according to this invention. The active task structure 28 maintains background references to background tasks which the background processor task 18 executes consecutively in a single thread. While background processor task 18 primarily loops through and executes the tasks referenced in active task structure 28, periodically, the background processor task 18 traverses the pending task structure 24 and retrieves references, such as the reference 12', from the pending task structure 24. The background processor task 18 determines if the reference 12' already exists in the active task structure 28. If the reference 12' does not already exist in the active task structure 28, the reference 12' is added to the active task structure 28.

When executing background tasks, the background processor task 18 traverses the active task structure 28. Each reference in the active task structure 28, such as reference 12', is retrieved and the "pair" is separated into its components, such as a function pointer and arguments. The background processor task 18 then initiates the task which is referenced by reference 12, such as task 36. Because task 36 executes in the single background processor thread 19, task 36 executes from start to finish without interruption. Consequently, such background tasks are preferably relatively small, or "lightweight", such that they execute quickly and do not adversely effect the timely execution of other registered background processes. Upon completion, the background processor task 18 extracts the next reference (reference 16') from active task structure 28. The background processor 18 then executes a task, such as task 38 via the reference 16'. Upon completion of the task 38, the background processor task 18 continues traversing the active task structure 28 to determine if other references exist. As shown in FIG. 2, no other references exist in the active task structure 28, at which time background processor 18 processes pending task structure 24 and task removal structure 34. Background processor 18 then processes active task structure 28 again, and once again retrieves reference 12' and executes task 36. This process is repeated as long as references exist in the active task structure 28.

Figure 3:
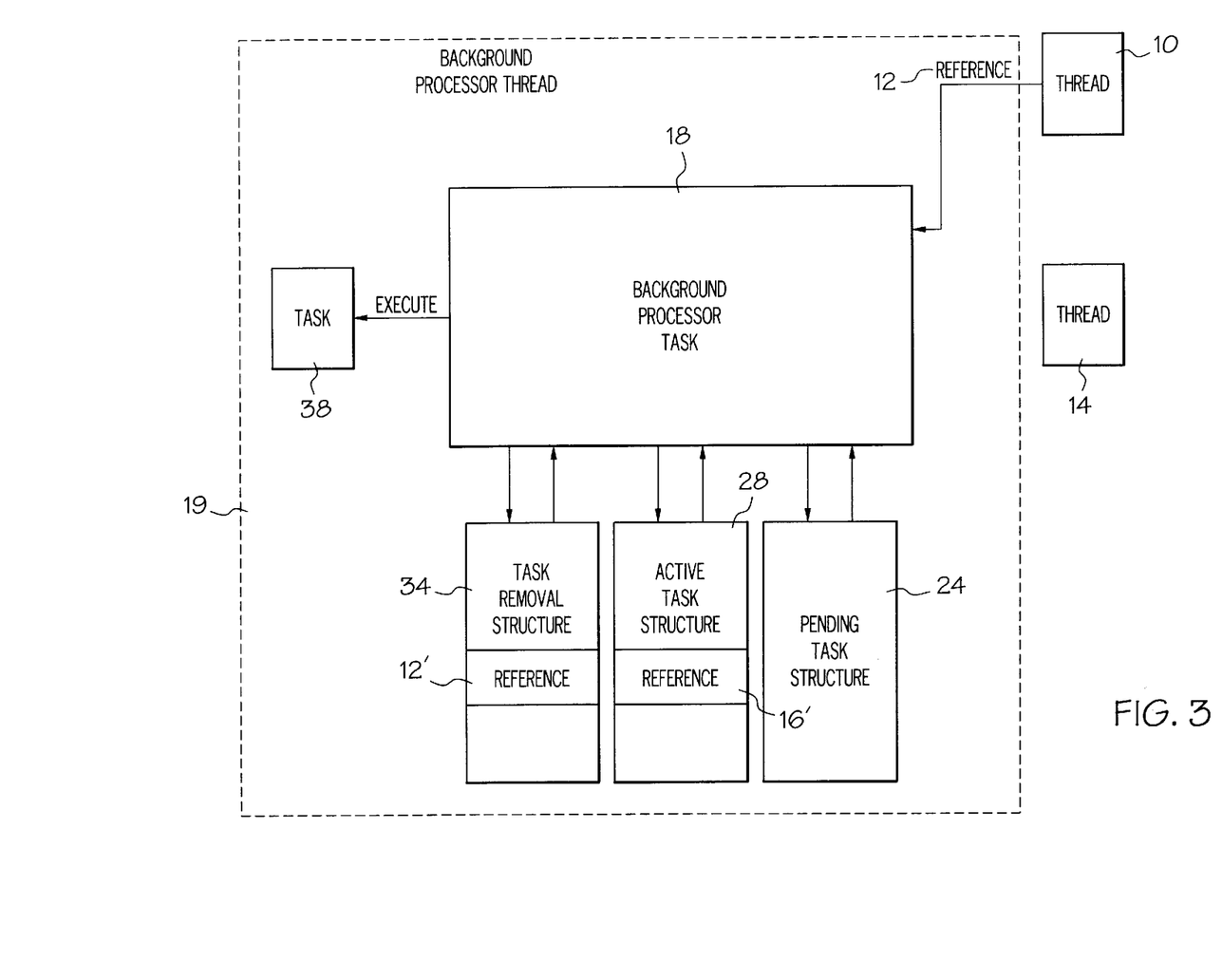
FIG. 3 is a block diagram illustrating a background task being unregistered from the background processor shown in FIG. 1.

FIG. 3 is a block diagram showing background processor thread 19 unregistering a background task. An external thread which seeks to unregister a previously registered background task communicates the reference 12 to the background processor task 18 to indicate that the task 38 should no longer be executed. The reference 12 comprises the same function pointer and arguments used to register task 38. The reference 12 is formed into a "pair" as described above (referred to as reference 12') and is stored by the background processor task 18 in task removal structure 34. Again, this is preferably achieved by invoking a method offered by background processor task 18 which inserts a passed reference into task removal structure 34. Periodically the background processor task 18 examines the task removal structure 34 to determine if any tasks should be removed from the active task structure 28. Upon determining that the reference 12' exists in the task removal structure 34, the background processor task 18 removes the reference 12' from the active task structure 28 and no longer executes the task 36 associated with the reference 12', without affecting execution of other tasks, such as the task 38.

The pending task structure 24 and task removal structure 34 are provided for concurrency purposes, to eliminate race conditions between background processor task 18 and external threads 10 and 14. Pending task structure 24 and task removal structure 34 are accessed in a thread-safe manner, ensuring that neither structure is accessed simultaneously by two separate threads. Background processor task 18 continually loops through active task structure 28 executing each registered task. Periodically, background processor task 18 traverses pending task structure 24 and moves each pending task to active task structure 28. Background processor task 18 also periodically traverses task removal structure 34, removing any tasks from active task structure 28 which are identified in task removal structure 34. This overall mechanism provides a relatively simple means for external processes to selectively register and unregister background processes as desired, and also results in a plurality of background processes executing in a single thread, eliminating system overhead, processor time, and memory usage associated with the plurality of threads which would otherwise be required to execute such background processes.

The embodiment described herein assumes the use of a separate background processor task 18 for each process. Thus, the threads spawned from a particular process each use the same background processor task 18. However, by using the appropriate system inter-process communication mechanisms, a single background processor task 18 could be initiated to handle all background processing tasks from any process on the system.

Preferably, background processor task 18 is an object instantiated from a class which contains methods which can be invoked by external threads 10 and 14, and by background processor task 18 itself, for registering and unregistering background processes. For purposes of illustration, and with regard to FIGS. 4–9, the method invoked to register a background task will be referred to as the addCallback method, and the method invoked to unregister a background task will be referred to as the removeCallback method. The addCallback and removeCallback methods can be invoked by an external thread even while the background processor task 18 is processing the active task structure 28. Background processor task 18 preferably invokes the removeCallback method upon receiving a return value of False from a background task, indicating that the background task should be unregistered. Although the addCallback and removeCallback methods will be referred to independently of the main processor loop of background processing task 18, they are in fact part of the background processor task 18 as they are methods offered by background processor task 18.

Figure 4:
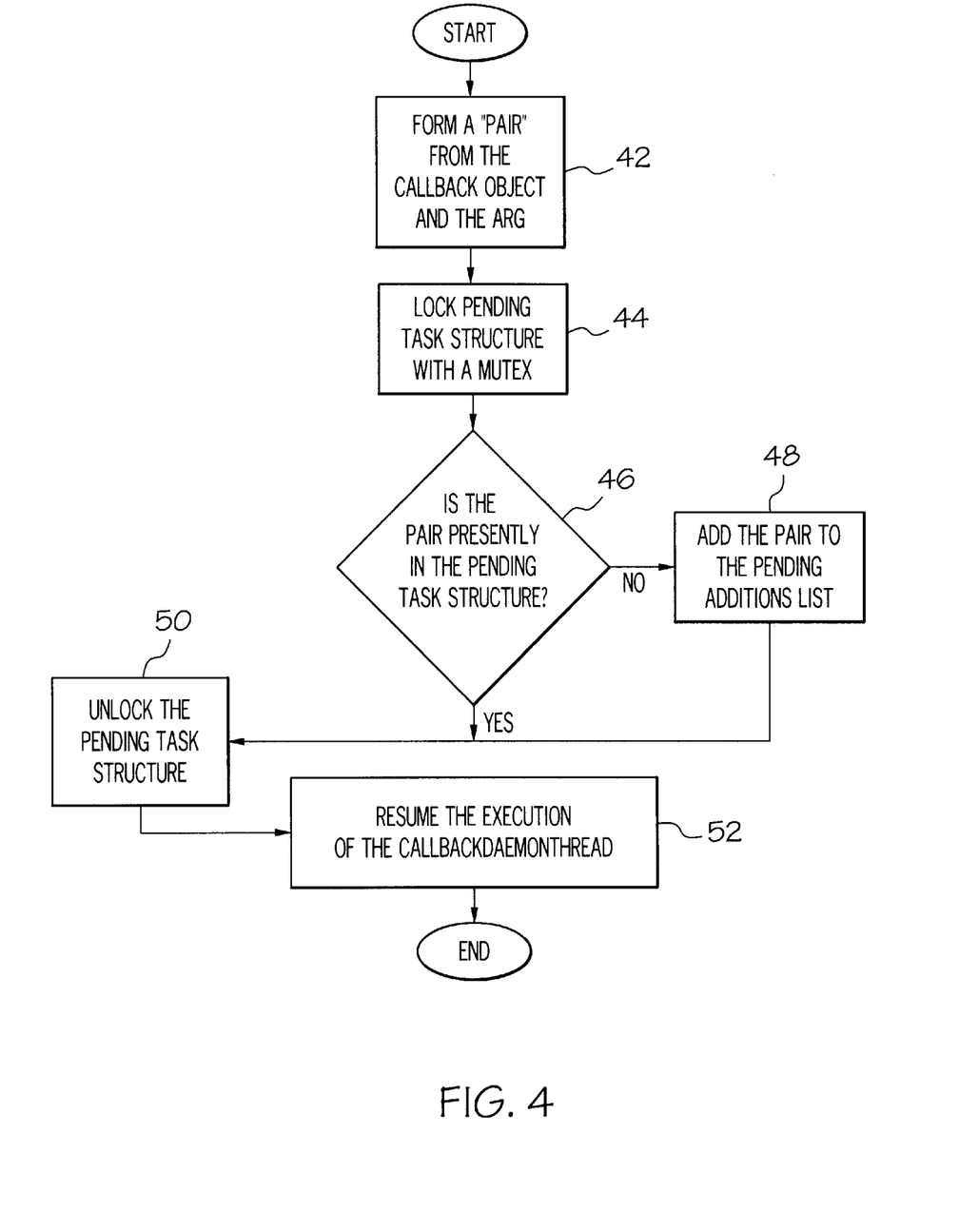
FIG. 4 is a flow diagram illustrating steps for adding a reference to a pending task structure.

FIGS. 4–9 are flow diagrams which will generally be described with reference to FIGS. 1–3. FIG. 4 is a flow diagram illustrating steps the addCallback method takes to register a background task, according to one embodiment of this invention. Preferably, the addCallback method expects two parameters from an external thread, an object or function pointer identifying the background task and one or more arguments for the background task. At block 42, the addCallback method forms a "pair" from these parameters. At block 44, the addCallback method locks pending task structure 24, to prevent other external threads from adding background task references while this particular reference is being added. At block 46, the addCallback method determines if the "pair" already exists in pending task structure 24. If not, at block 48 the addCallback method adds the "pair" to the pending task structure 24 and continues execution at block 50. If the "pair" does exist, at block 50 the addCallback method unlocks the pending task structure 24, and does not add the "pair." At block 52, the addCallback method "resumes" the background processor task 18, which may have suspended itself if active task structure 28 was empty.

Figure 5:
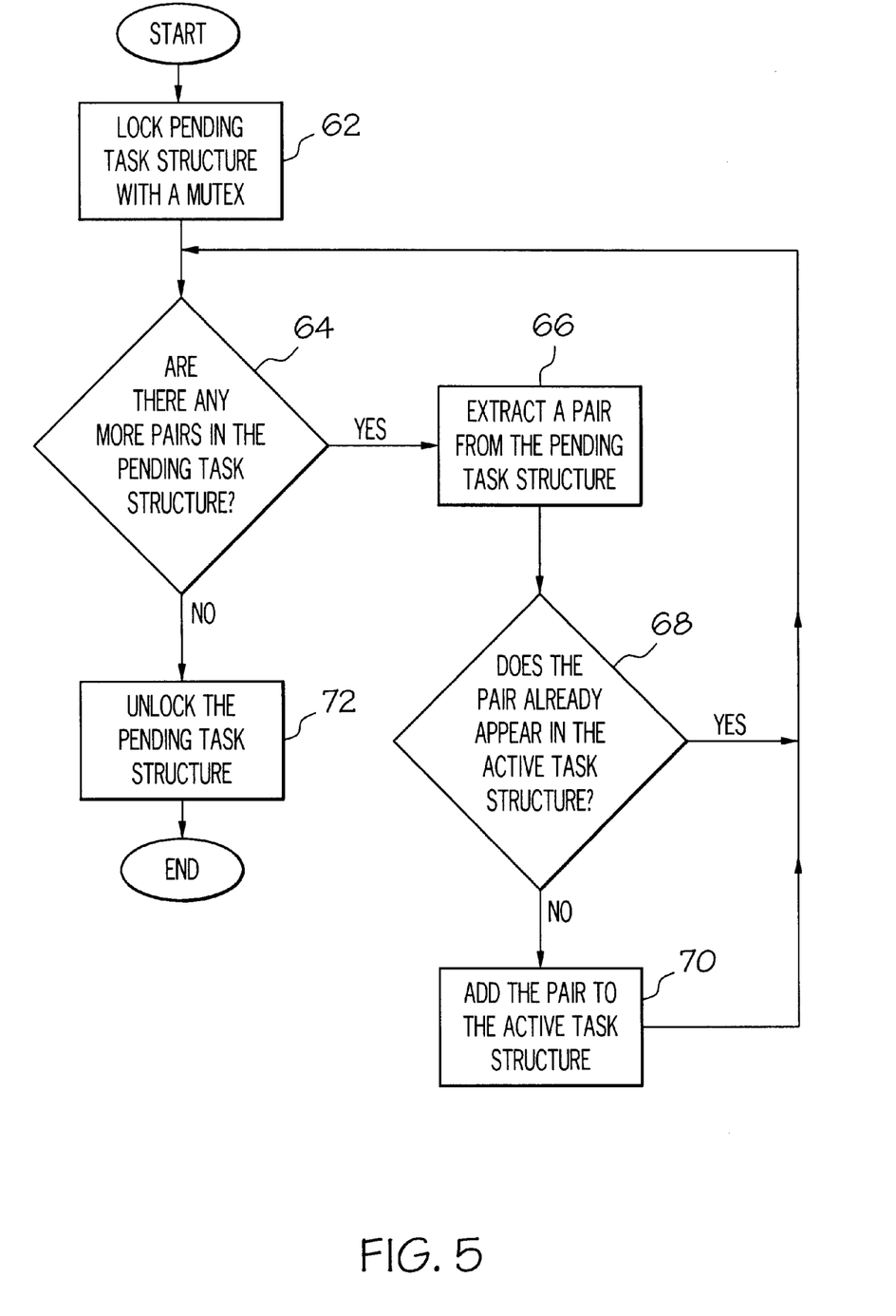
FIG. 5 is a flow diagram illustrating steps for inserting a reference into an active task structure.

FIG. 5 is a flow diagram illustrating steps for retrieving references from the pending task structure 24 and storing the references in the active task structure 28. At block 62, background processor task 18 locks pending task structure 24 to prevent external threads from registering background processes while pending task structure 24 is being processed. At block 64, background processor task 18 determines if there are any references in pending task structure 24. If pending task structure 24 is empty, then at block 72, background processor task 18 unlocks pending task structure 24. If one or more references exist in pending task structure 24, at block 66, background processor task 18 retrieves and removes one of the references from pending task structure 24. At block 68, the background processor task 18 determines if the reference already exists in active task structure 28 by comparing the reference retrieved from the pending task structure 24 with each reference in the active task structure 28. If the reference retrieved from pending task structure 24 matches a reference in active task structure 28, the reference is not added and execution continues at block 64 as described above. If the reference does not exist in the active task structure 28, then at block 70, the background processor task 18 stores the reference in the active task structure 28 and execution continues at block 64.

Figure 6:
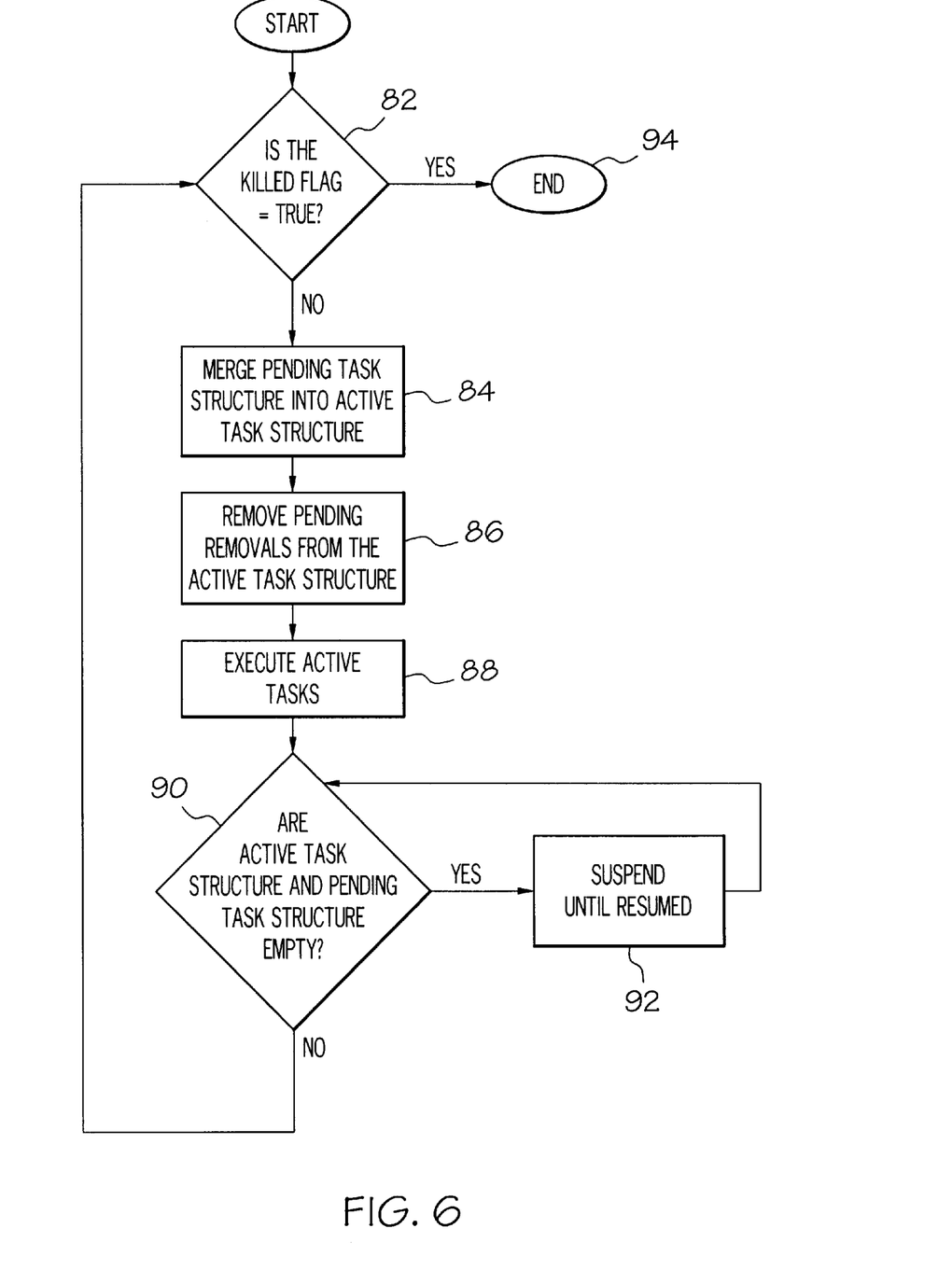
FIG. 6 is a flow diagram illustrating steps for executing a main operation loop of the background processor, according to one embodiment of this invention.

FIG. 6 is a flow diagram illustrating the overall general flow of background processor task 18 according to one embodiment of this invention. At block 82, background processor task 18 determines if it has been killed by the process which initiated it. By killed it is meant that the background processor has been requested to cease execution. If the background processor has not been killed, then at block 84 the background processor merges the references in pending task structure 24 into active task structure 28. By "merge" it is meant that background processor task 18 retrieves references from pending task structure 24 and stores the references in active task structure 28 without altering the references which already exist in active task structure 24. The references are then removed from the pending task structure 24. At block 86, the background processor task 18 traverses task removal structure 34. Any reference in active task structure 28 which matches a reference in task removal structure 34 is removed from active task structure 28. At block 88, background processor 18 executes the tasks associated with the references in active task structure 28. Each task is executed consecutively, from start to finish, in background processor thread 19. At block 90, the background processor task 18 determines if the active task structure 28 and the pending task structure 24 are both empty. If so, then at block 92 the background processor task 18 suspends itself until a reference is stored in the pending task structure 24, as discussed with reference to FIG. 4. By suspends it is meant that the background processor 18 waits for a reference to be stored in pending task structure 24 before continuing the execution loop. A suspended task consumes a relatively small amount of computing resources. If either active task structure 28 or pending task structure 24 contain a reference, the background processor task 18 repeats the execution loop by returning to block 82 and continuing as described above.

Figure 7:
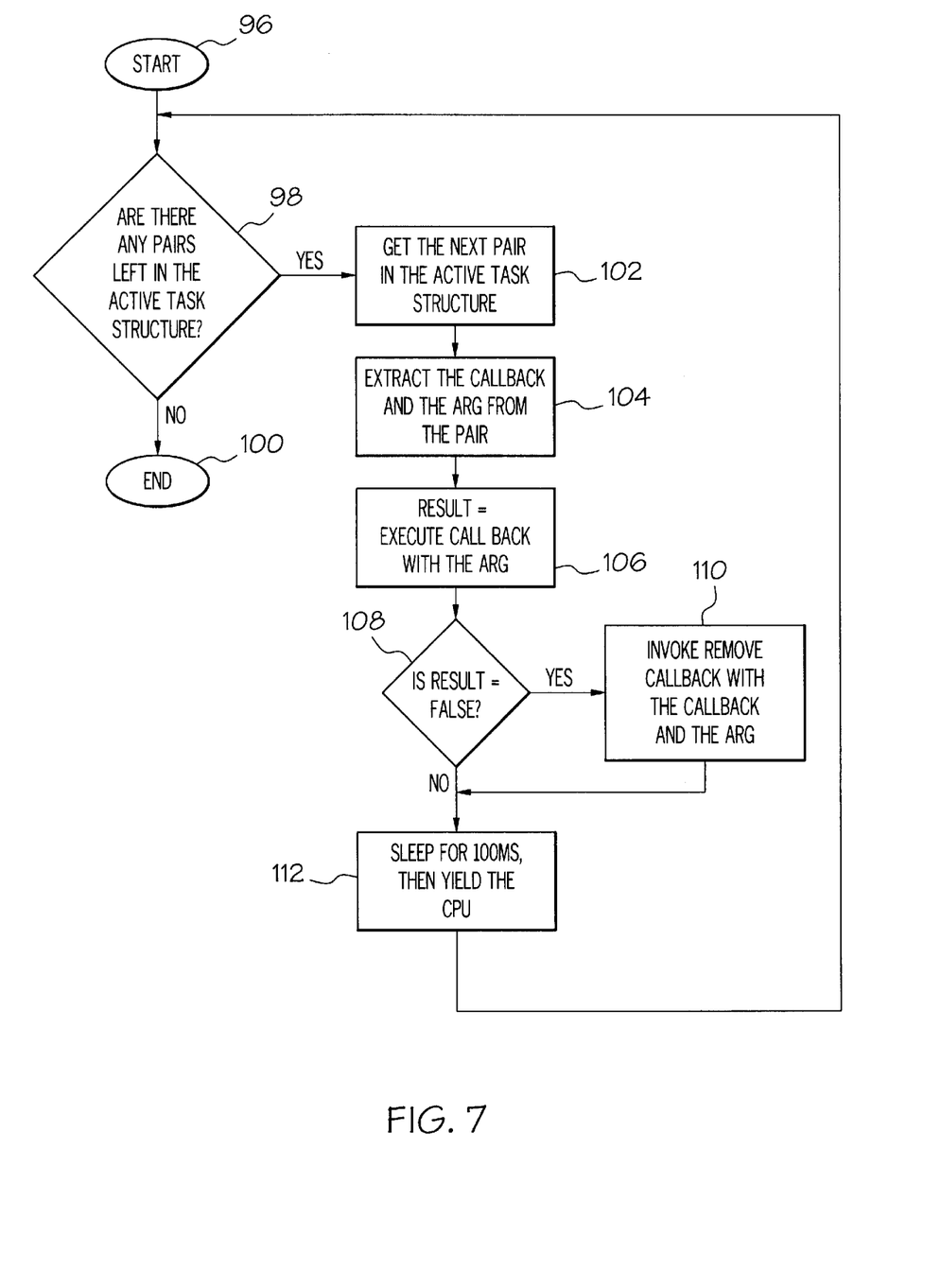
FIG. 7 is a flow diagram illustrating certain aspects of the flow diagram of FIG. 6 in greater detail, according to one embodiment of this invention.

FIG. 7 is a flow diagram illustrating the process described in block 88 of FIG. 6 in greater detail. At block 98 the background processor task 18 determines if a "pair" (reference) exists in active task structure 28. If so, at block 102 the background processor task retrieves the next pair from the active task structure 28. At block 104, the background processor task 18 converts the pair into the reference and the argument from which the pair was originally composed. The method for converting a pair into the components that compose the pair is known to those skilled in the art. At block 106, the background processor task 18 executes the task identified by the reference extracted from the pair. By convention, the task preferably returns a boolean result upon completion. By "boolean result," it is meant that the task returns a value representing true or false. If at block 108 the value returned by the task is false, at block 110 the background processor task 18 inserts the reference associated with the task in the task removal structure 34, and continues execution at block 112. If the value returned by the task is true, then at block 112, the background processor task 18 sleeps for a period of time, surrendering the microprocessor to other tasks.

Figure 8:
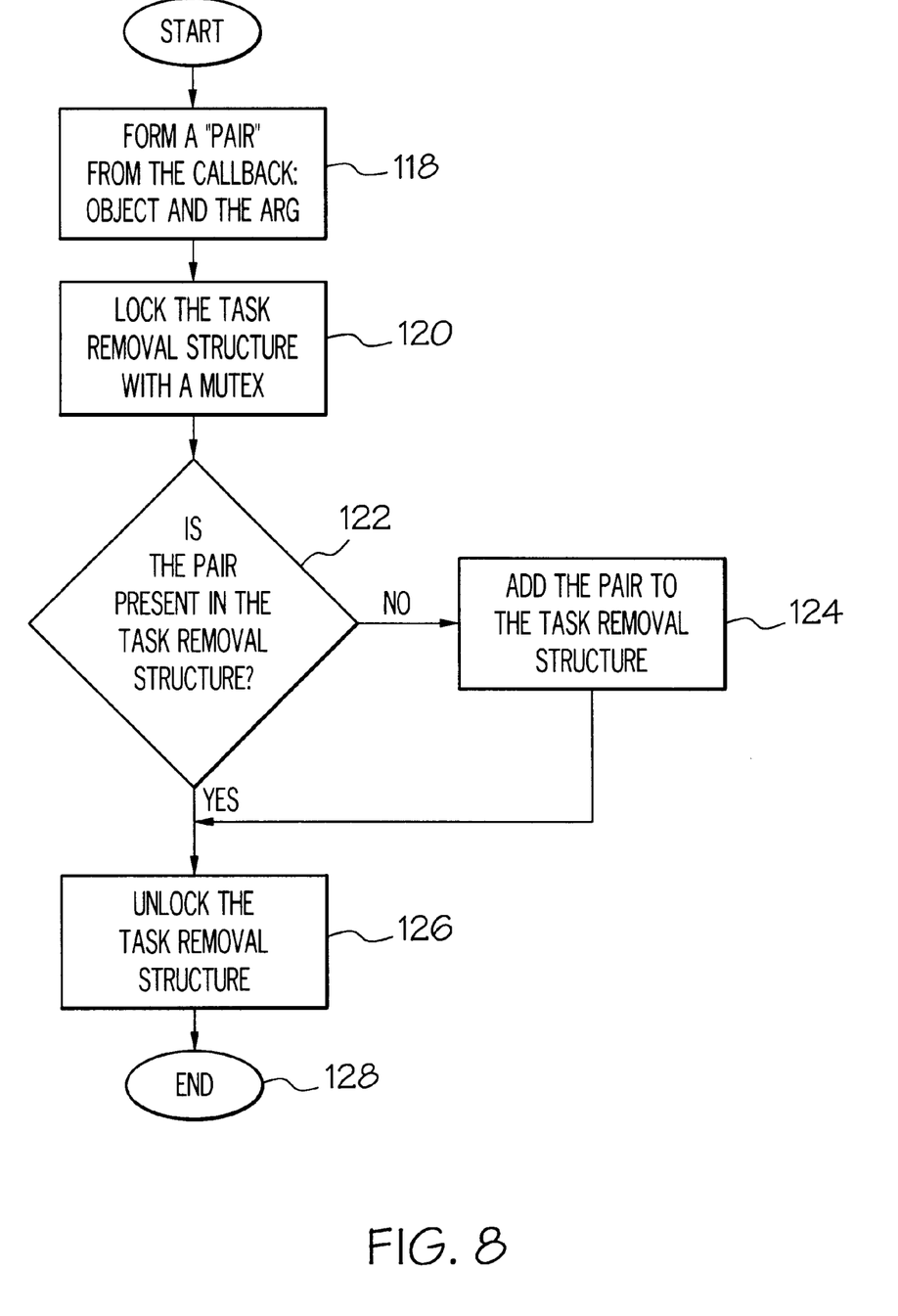
FIG. 8 is a flow diagram illustrating steps for adding a reference to a task removal structure.

FIG. 8 is a flow diagram illustrating steps the remove-Callback method takes to unregister a background task. At block 118, a thread invokes the removeCallback method, passing the same object or function and argument used to register the background task with the addCallback method (see FIG. 4). The removeCallback method forms a "pair" from the reference and the arguments, as explained previously. At block 120, the removeCallback method locks the task removal structure 34. At block 122, the removeCallback method determines if the pair is already present in the task removal structure 34. If the pair is not present in the task removal structure 34, at block 124 the pair is stored in the task removal structure 34, and execution continues at block 126. At block 126, the removeCallback method unlocks the task removal structure 34.

Figure 9:
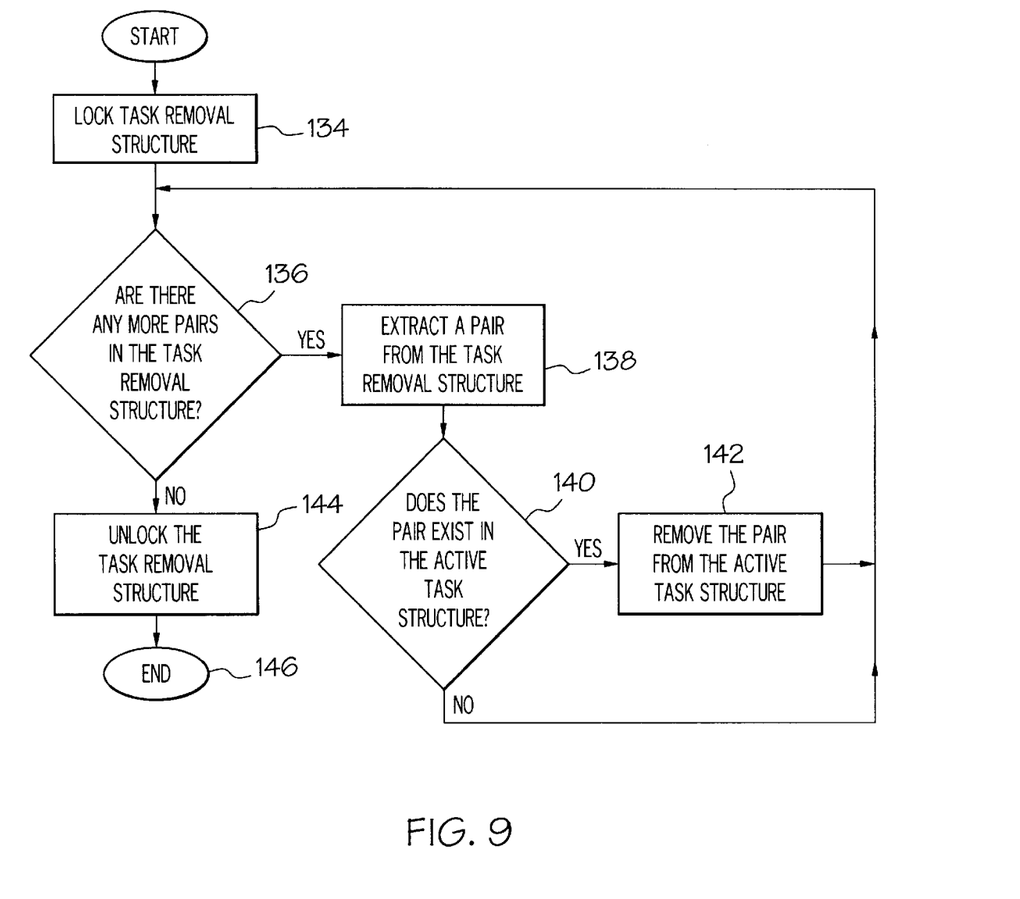
FIG. 9 is a flow diagram illustrating steps for removing a reference from the active task structure.

FIG. 9 is a flow diagram illustrating a method for retrieving "pairs" from the task removal structure 34 and unregistering background tasks associated with the "pairs." At block 134, the background processor task 18 locks the task removal structure 34. At block 136, it is determined if there are any "pairs" present in the task removal structure 34. If not, at block 144 the background processor task 18 unlocks the task removal structure 34. If there are "pairs" in the task removal structure 34, at block 138 the background processor task 34 retrieves and removes a "pair" from the task removal structure 34. At block 140, it is determined if the "pair" retrieved from the task removal structure 34 exists in the active task structure 28. If not, execution continues at block 136. If the "pair" retrieved from the task removal structure 34 does exist in the active task structure 28, at block 142 the background processor task 18 removes the "pair" from the active task structure 28. Execution then continues at block 136 as explained above.

According to one embodiment of this invention, background processor thread 19 is a JAVA class, and interfaces with external threads 10, 14 through method invocation, for example by offering the addCallback and removeCallback methods as described above. Background processor thread 19 can be constructed at class load-time, and is started after instantiation, but is suspended until one or more background processes have been registered. Threads which wish to register and unregister background processes for execution implement the following interface:

public interface DaemonCallback
   {boolean deamonCallback(Object arg);}

To register a background task for execution, the following method is invoked:

addCallback(DaemonCallback callback, Object Arg)

The background process to be registered implements the DaemonCallback interface, and thus can be passed as a DaemonCallback argument, and the arguments are passed in as an Object. The Arg argument can be, for example, a NULL if no argument is required, or a pointer to a structure.

To unregister a background task, the following method is invoked:

removeCallback(DaemonCallback callback, Object Arg).

EXAMPLE

The following code segment shows a process that has implemented the DaemonCallback interface adding a background process to a background processor task entitled 'CallbackDaemonThread':

CallbackDaemonThread.getInstance( ).addCallback(this, null);

The CallbackDaemonThread background processor is defined as 'public static', and the getinstance method returns the instance of that particular background processor task. This prevents a process from accidentally (or intentionally) instantiating more than one background processor task.

The invoking process contains the following method, which is what is passed to the background processor in the addCallback invocation:

```
public boolean daemonCallback(Object arg)
{
[appropriate functionality contained here]
    return true;
}
```

The following code segment unregisters the background task:

CallbackDaemonThread.getInstance( ).removeCallback (this, null);

In summary, numerous benefits have been described which result from employing the concepts of the invention. The background processor task requires relatively few system resources, and eliminates the system overhead associated with running multiple background processes in a single thread. The background processor simplifies the method of running a background process, requiring only that an initiating thread pass the background processor a reference to a task, and the task's arguments. Any background task can be scheduled, and can be scheduled multiple times with different arguments. Any thread with the appropriate "signature" can unregister a background task, or the background task can be unregistered itself.

A still further benefit of the invention is that the background processor task does not allow duplicate references. The background processor checks each reference before storing the reference in the pending task structure to verify that the reference is not already present in the pending task structure. Further, before storing a reference in the active task structure, the background processor verifies that the reference does not already exist in the active task structure. The background processor task therefore eliminates the possibility of running redundant tasks, which would waste system resources. It is not necessary for the calling thread to verify that the task the background processor will run is not already running because the background processor assumes this responsibility.

The foregoing description of preferred embodiments of the invention have been presented for purposes of illustration and description. It is not intended to be exhaustive or to limit the invention to the precise form disclosed. Obvious modifications or variations are possible in light of the above teachings. The embodiments were chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

I claim:

1. A method for executing a task, comprising the steps of:
    initiating a background-processing thread associated with a pending task structure and an active task structure;
    receiving a reference to a task from an external thread and inserting the reference in the pending task structure;
    determining that the reference exists in the pending task structure and if the reference does exist inserting the reference into the active task structure; and
    reading the active task structure and executing the task in the background-processing thread via the reference.

2. A method according to claim 1, wherein the background-processing thread has a task removal structure, further comprising the steps of:
    determining that an identifier corresponding to a task in the active task structure exists in the task removal structure; and
    removing the task corresponding to the identifier from the active task structure.

3. A method according to claim 2, wherein the identifier comprises the reference.

4. A method according to claim 1, further comprising removing the reference from the pending task structure before executing the task.

5. A method according to claim 1, further comprising determining if the active task structure and the pending task structure lack a reference, and if so, placing the background-processing thread in a paused state until the pending task structure contains a reference.

6. A method according to claim 1, further comprising the steps of:
    determining if either the active task structure or the pending task structure contain an entry, and if so,
    determining that the reference exists in the pending task structure and if the reference does exist inserting the reference into the active task structure; and
    reading the active task structure and executing the task in the background-processing thread via the reference.

7. A method according to claim 1, further comprising determining that the reference does not exist in the pending task structure before inserting the reference in the pending task structure.

8. A method according to claim 1, further comprising adding a reference to the task removal structure only if the reference does not exist in the task removal task structure.

9. A method according to claim 1 wherein the reference comprises a function pointer referring to the task and one or more arguments associated with the task.

10. A method according to claim 1, further comprising receiving the identifier corresponding to the task and inserting the identifier in the task removal structure.

11. A method according to claim 1, wherein the background-processing thread is an object that is instantiated from a class which includes a method invocable by the external thread for inserting the reference in the pending task structure.

12. A method for executing a task, comprising the steps of:
    starting a background-processing thread having a pending task structure and an active task structure;
    inserting a plurality of references, each reference referring to a corresponding task received from one or more external threads, in the pending task structure;
    retrieving the plurality of references from the pending task structure, and storing the plurality of references in the active task structure; and
    reading the active task structure and performing in the background-processing thread each task corresponding to the references.

13. A method for executing a task according to claim 12, wherein the plurality of references are retrieved consecutively.

14. A method for executing a task according to claim 12, further comprising locking the pending task structure in a thread-safe manner before inserting each of the plurality of references in the pending task structure.

15. A method for executing a task according to claim 12, further comprising placing the task in a paused state for an interval of time after performing each task corresponding to the references in the active task structure in the background-processing thread.

16. A system for executing a task, comprising:
    a first memory containing a pending task structure;

a second memory containing an active task structure;

a background-processing thread having,
1) a first processing segment being operative to receive a reference to a task from an external thread;
2) a second processing segment being operative to store the reference in the pending task structure;
3) a third processing segment being operative to retrieve the reference from the pending task structure and being operative to store the reference in the active task structure; and
4) a fourth processing segment being operative to execute the task via the reference in the background-processing thread.

17. A system according to claim 16, further comprising a third memory having a task removal structure.

18. A system according to claim 16, further comprising a background-processing thread having a fifth processing segment being operative to retrieve a reference from the task removal structure, being operative to compare the reference retrieved from the task removal structure with each reference in the active task structure, and if the reference retrieved from the task removal structure matches a reference in the active task structure, being operative to remove the reference from the active task structure.

19. A system according to claim 16, wherein the second processing segment is operative to lock the pending task structure in a thread-safe manner before storing the reference in the pending task structure.

20. A system according to claim 16, wherein the system is an object instantiated from a class, and wherein the second processing segment is a method of the class and is invocable by the external thread.

* * * * *